United States Patent [19]
Webster et al.

[11] Patent Number: 5,558,121
[45] Date of Patent: Sep. 24, 1996

[54] FLUID ACTUATED BALL CHECK VALVE ASSEMBLY

[75] Inventors: Alexander P. Webster, Concord; Gary M. Jenski, Jr., Jackson, both of Mich.

[73] Assignee: Aeroquip Corporation, Maumee, Ohio

[21] Appl. No.: 478,100

[22] Filed: Jun. 7, 1995

[51] Int. Cl.⁶ .................................................. F16K 15/04
[52] U.S. Cl. .......................................... 137/511; 137/539
[58] Field of Search ................................. 137/494, 511, 137/528, 539

[56] References Cited

U.S. PATENT DOCUMENTS

| | | | |
|---|---|---|---|
| 2,973,005 | 2/1961 | Dollison et al. | 137/556 |
| 3,236,255 | 2/1966 | Sizer | 137/494 |
| 3,763,933 | 10/1973 | Mott | 137/494 |
| 3,788,594 | 1/1974 | Mott | 137/494 |
| 4,262,693 | 4/1981 | Giebeler | 137/494 |
| 4,377,179 | 3/1983 | Giebeler | 137/494 |
| 4,438,779 | 3/1984 | Allread . | |
| 4,445,664 | 5/1984 | Allread . | |
| 4,565,213 | 1/1986 | Giebeler | 137/494 |
| 4,643,216 | 2/1987 | Allread et al. . | |
| 5,090,448 | 2/1992 | Truchet . | |
| 5,501,242 | 3/1996 | Coutts et al. | 137/511 |

*Primary Examiner*—James Larson
*Attorney, Agent, or Firm*—Emch, Schaffer, Schaub & Porcello Co., L.P.A.

[57] ABSTRACT

A fluid actuated ball check valve assembly having an annular housing containing a ball valve. The annular housing has a first end and a second end. The annular housing defines a fluid passageway having a passageway axis extending therethrough. A fluid actuated ball valve is pivotally mounted in the fluid passageway. The ball valve defines a bore having a bore extending therethrough. Resilient members, such as a sleeve in contact with a coiled spring, engage the ball valve to maintain the ball valve in the fluid passageway. Pressurized fluid in the fluid passageway at the first end of the annular housing causes the ball valve to pivot from a closed position to an open position to allow fluid to flow through the fluid passageway from the first end to the second end of the annular housing. When pressurized fluid is not acting upon the ball valve at the first end of the annular housing and the ball valve is maintained in a closed position, fluid is prevented from flowing through the fluid passageway from the second end to the first end of the annular housing.

9 Claims, 3 Drawing Sheets

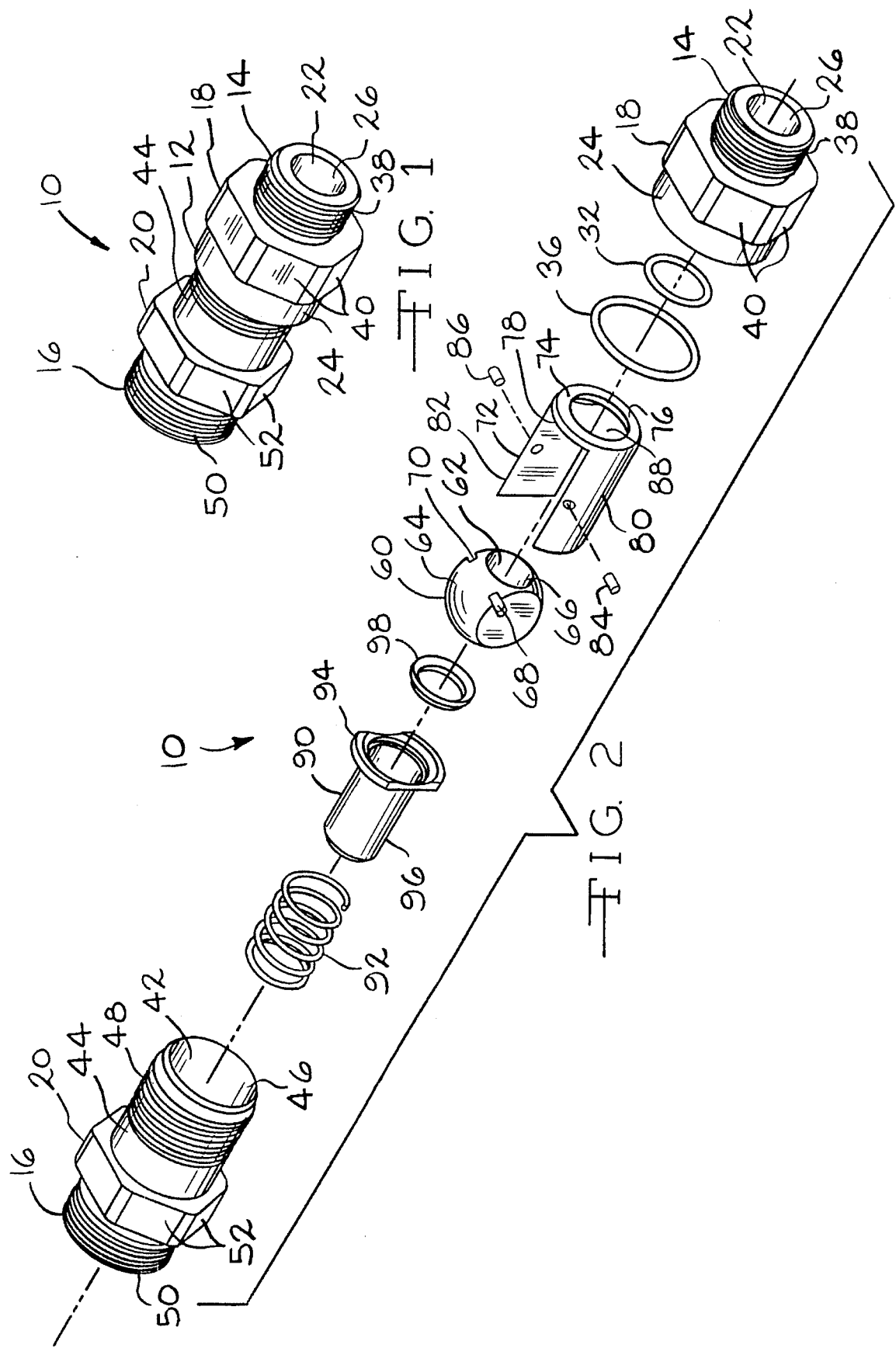

FLUID ACTUATED BALL CHECK VALVE ASSEMBLY

BACKGROUND OF THE INVENTION

The present invention is directed to a ball check valve assembly. More specifically, the present invention is directed to a fluid actuated ball check valve assembly.

Ball check valve assemblies are known in the art. Examples of such assemblies are shown in U.S. Pat. Nos. 4,445,664 and 5,090,448. In these types of assemblies, the valves are actuated by engagement with an opposing valve or fitting.

There is a need for a ball check valve assembly in which the ball valve is fluid actuated. The present invention satisfies this need.

SUMMARY OF THE INVENTION

The present invention is directed to a fluid actuated ball check valve assembly having an annular housing containing a ball valve. The annular housing has a first end and a second end. The annular housing defines a fluid passageway having a passageway axis extending therethrough. A fluid actuated ball valve is pivotally mounted in the fluid passageway. The ball valve defines a bore having a bore axis extending therethrough. Resilient means, such as a sleeve in contact with a coiled spring, engage the ball valve to maintain the ball valve in the fluid passageway. Pressurized fluid in the fluid passageway at the first end of the annular housing causes the ball valve to pivot from a closed position to an open position to allow fluid to flow through the fluid passageway from the first end to the second end of the annular housing. When pressurized fluid is not acting upon the ball valve at the first end of the annular housing and the ball valve is maintained in a closed position, fluid is prevented from flowing through the fluid passageway from the second end to the first end of the annular housing.

The primary object of the present invention is to provide a ball check valve assembly that is fluid actuated.

An important object of the present invention is to provide a ball check valve assembly that stabilizes the coiled spring used to maintain the ball valve to prevent valve chatter.

Other objects and advantages of the invention will become apparent upon a review of the attached drawings and the following detailed description of the preferred embodiment of the present invention.

BRIEF DESCRIPTION OF THE DRAWINGS

FIG. 1 is a perspective view of the annular housing according to the present invention;

FIG. 2 is an exploded view of the fluid actuated ball check valve assembly according to the present invention;

DETAILED DESCRIPTION OF THE PREFERRED EMBODIMENT

Figure 3:
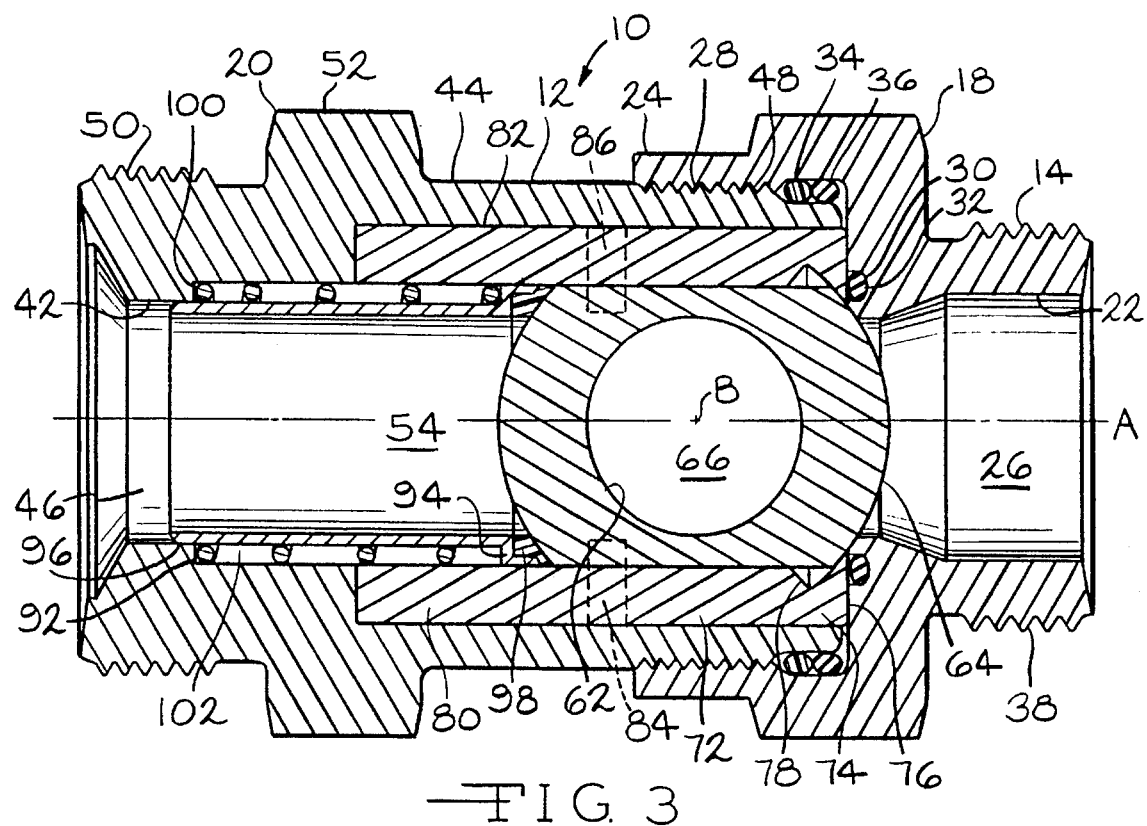
FIG. 3 is a top sectional view through the center of the fluid actuated ball check valve assembly according to the present invention with the ball valve in a closed position.

The present invention will now be described with reference being made to the drawings. The fluid actuated ball check valve assembly of the present invention is shown in FIGS. 1 and 2 and indicated generally by the reference number 10. The valve assembly 10 includes an annular housing 12 having first end 14 and second end 16. The annular housing 12 includes a first adapter 18 at the first end 14 and a second adapter 20 at the second end 16.

As shown in FIGS. 1, 2 and 3, the first adapter 18 has an interior surface 22 and an exterior surface 24. The interior surface 22 defines a first fluid passageway 26. As shown in FIG. 3, the interior surface 22 further defines a first threaded portion 28. The interior surface 22 also defines at least one radially extending groove 30 for receiving a seal, such as an O-ring seal 32. As shown in FIG. 3, other seals, gasket or bearings, such as bearing 34 and O-ring seal 36 can be positioned adjacent the interior surface 22. The seals prevent leakage of fluid from the annular housing 12. The exterior surface 24 of the first adapter 18 can include a first conduit threaded portion 38 so that the valve assembly 10 can be attached to a first conduit (not shown). The exterior surface 24 can also include first lands 40 adapted to receive a tool so that the first adapter 18 can be moved by the tool when it is being attached to the second adapter 20 or a first conduit.

As shown in FIGS. 1, 2 and 3, the second adapter 20 of the annular housing 12 includes an inner surface 42 and an outer surface 44. The inner surface defines a second fluid passageway 46. The outer surface 44 defines a second threaded portion 48 for mating engagement with the first threaded portion 28 of the first adapter 18. The outer surface 44 can include a second conduit threaded portion 50 to allow the valve assembly 10 to be attached to a second conduit (not shown). The outer surface 44 can also include second lands 52 adapted to receive a tool to move the second adapter 20 when it is being attached to the first adapter 18 or a second conduit.

Still referring to FIGS. 1, 2 and 3, when the first adapter 18 is attached to the second adapter 20, the first fluid passageway 26 and the second fluid passageway 46 form a longitudinally extending fluid passageway 54 through the annular housing 12. As shown in FIGS. 3 through 6, the fluid passageway 54 has a longitudinally extending passageway axis A.

Referring now to FIGS. 2 and 3, the valve assembly 10 includes a ball valve 60 having a generally spherical configuration. The ball valve 60 has an interior surface 62 and an exterior surface 64. The interior surface 62 defines a bore 66 that extends completely through the ball valve 60. As shown in FIGS. 3 through 6, the bore 66 has a bore axis B extending therethrough. The bore 66 allows for passage of fluid through the ball valve 60. The exterior surface 64 defines two opposed, offcenter pin slots 68 and 70. As described below, the pin slots 68 and 70 allow the ball valve 60 to be pivotally mounted in the fluid passageway 54.

As shown in FIGS. 2 and 3, the ball valve 60 is adapted to be received by a ball valve guide 72 that is positioned in the fluid passageway 54. The valve guide 72 includes a ball valve stop ring 74 having a first side 76 and a second side 78. A first ball valve support wall 80 and an opposed second ball valve support wall 82 extend from the second side 78. The support walls 80 and 82 each include one inwardly extending ball valve pin 84 and 86, respectively. The pins 84 and 86 are opposed to one another as shown in FIG. 2. The pins 84 and 86 are received by the slots 68 and 70, respectively, that are defined on the exterior surface 64 of the ball valve 60. This arrangement allows the ball valve 60 to pivot between closed and open positions as described below. The stop ring 74 defines an opening 88.

As shown in FIGS. 2 and 3, the valve assembly 10 includes a resilient means that consists of a sleeve 90 and a coiled spring 92. The sleeve 90 includes a flared ball valve engagement end 94 and a cylindrical coiled spring end 96. The engagement end 94 can include a plastic bearing 98 upon which the ball valve 60 is seated. The coiled spring end 96 is adapted to receive the coiled spring 92. As shown in FIG. 3, the coiled spring 92 engages the engagement end 94 and a shoulder 100 defined by the inner surface 42 of the second adapter 20. A dashpot 102 is formed by the second adapter 20, the support walls 80 and 82, and the sleeve 90. The coiled spring 92 is positioned in the dashpot 102. This arrangement prevents the coiled spring 92 from lateral movement to eliminate valve chatter. The coiled spring 92 urges the ball valve engagement end 94 of the sleeve 90 against the ball valve 60 to maintain the ball valve in a normally closed position when not actuated by fluid. The coiled spring 92 also maintains the ball valve 60 in the fluid passageway 54 when the ball valve is in an open position as a result of fluid actuation.

Figure 4:
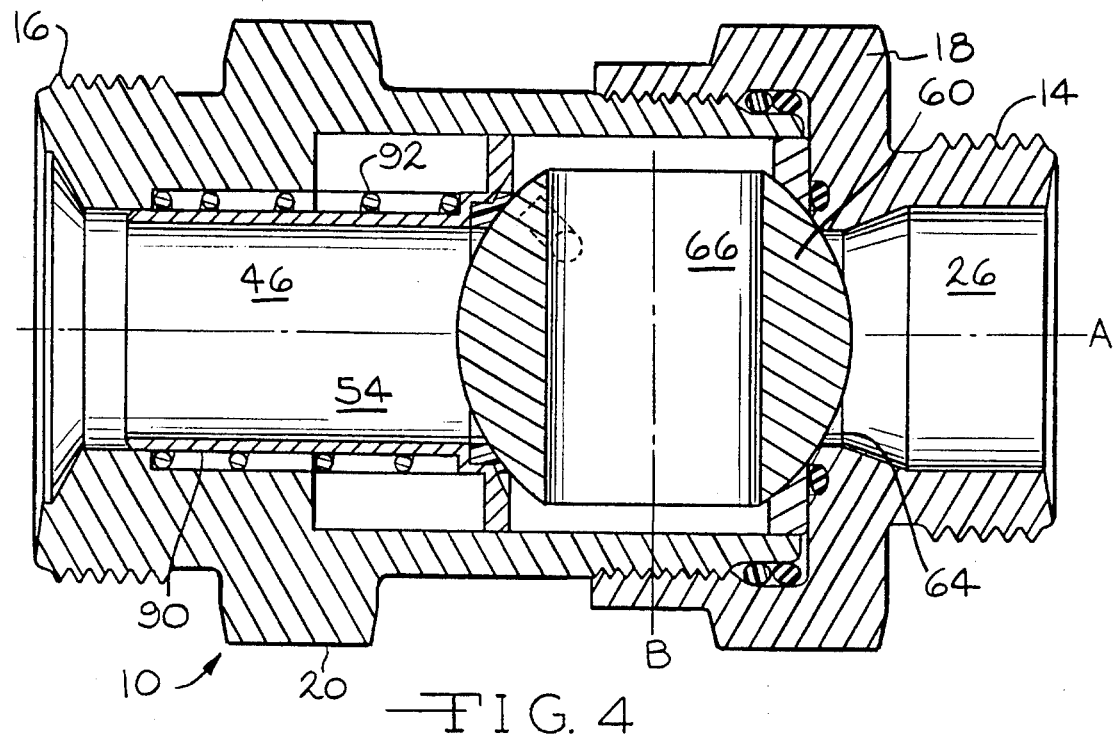
FIG. 4 is a side sectional view through the center of the fluid actuated ball check valve assembly of the present invention with the ball valve in a closed position.
Figure 5:
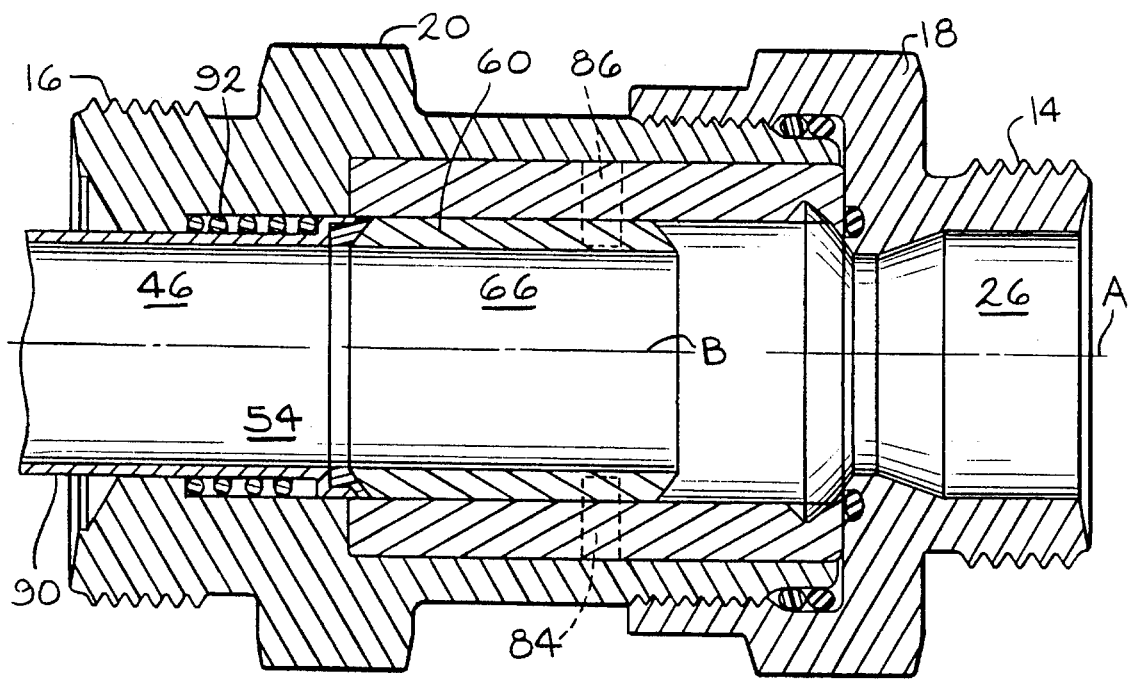
FIG. 5 is a view similar to the view of FIG. 3 with the ball valve in an open position.
Figure 6:
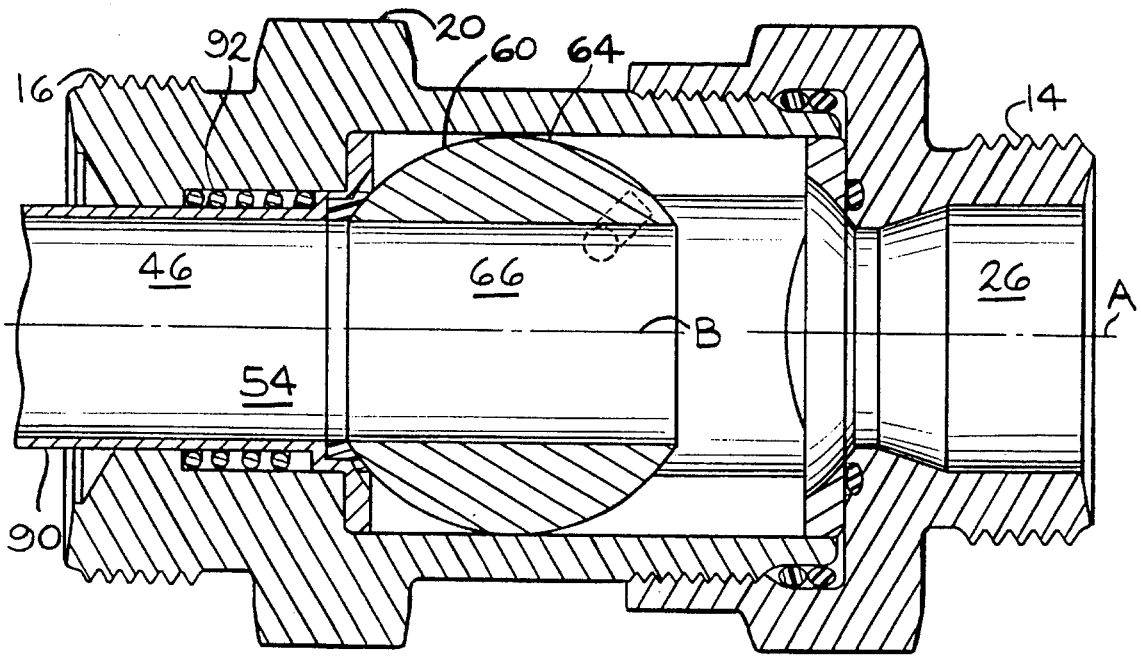
FIG. 6 is a view similar to the view of FIG. 4 with the ball valve in an open position.

The operation of the ball check valve 10 of the present invention is shown in FIGS. 3 through 6. As shown in FIGS. 3 and 4, the ball valve 60 is in the closed position wherein the passageway axis A is substantially perpendicular to the bore axis B. When the ball valve is in this position, the exterior surface 64 of the ball valve 60 prevents the flow of fluid through the fluid passageway 54 from the second end 16 to the first end 14 of the annular housing 12. As shown in FIGS. 5 and 6, when pressurized fluid in the first fluid passageway 26 acts on the exterior surface 64 of the ball valve 60, the ball valve is caused to pivot on the pins 86 and 88 wherein the passageway axis A is substantially parallel coincidental to the bore axis B. This allows fluid to flow through the fluid passageway 54 from the first end 14 to the second end 16 of the annular housing 12. It has been found that the present invention provides full fluid flow without a significant drop in fluid pressure. When the pressurized fluid in the first fluid passageway 26 ceases to act on the ball valve 60, the sleeve 90 and coiled spring 92 urge the ball valve 60 to pivot to its normally closed position as shown in FIGS. 3 and 4.

It should be understood that many changes can be made to the embodiment of the present invention described above with the scope of the invention being defined by the following claims.

We claim:

1. A fluid actuated ball check valve assembly comprising:
   an annular housing have a first end and a second end, said annular housing defining a fluid passageway having a passageway axis extending therethrough;
   a ball valve guide positioned in said fluid passageway including a ball valve stop ring having a first side and a second side, two opposed ball valve support walls extending from said second side of said stop ring, said support walls each having one inwardly extending ball valve pin, said pins being opposed to one another;
   a fluid actuated ball valve defining two opposed pin slots, said slots being adapted to receive said ball valve pins to allow said ball valve to pivot in said fluid passageway, said ball valve defining a bore having a bore axis extending therethrough; and
   resilient means engaging said ball valve to maintain said ball valve in said fluid passageway, whereby pressurized fluid in said fluid passageway at said first end of said annular housing causes said ball valve to pivot from a closed position wherein said fluid passageway axis is substantially perpendicular to said bore axis to an open position wherein said passageway axis is substantially parallel to said bore axis, said open position allowing fluid flow through said fluid passageway from said first end to said second end of said annular housing, and said closed position preventing fluid flow through said fluid passageway from said second end to said first end of said annular housing.

2. The ball check valve assembly of claim 1, wherein said annular housing includes a first adapter at said first end, said first adapter having an interior surface and an exterior surface, said interior surface defining said fluid passageway, said interior surface further defining a first threaded portion.

3. The ball check valve assembly of claim 2, wherein said interior surface of said first adapter defines at least one groove for receiving a seal.

4. The ball check valve assembly of claim 3, wherein said seal is an O-ring seal.

5. The ball check valve assembly of claim 2, wherein said annular housing further includes a second adapter at said second end, said second adapter having an inner surface and outer surface, said inner surface defining said fluid passageway, said outer surface defining a second threaded portion for mating engagement with said first threaded portion of said first adapter.

6. The ball check valve assembly of claim 1, wherein said fluid passageway is longitudinally extending through said annular housing.

7. A fluid actuated ball check valve assembly comprising:
   an annular housing having a first end and a second end, said annular housing defining a fluid passageway having a passageway axis extending therethrough;
   a fluid actuated ball valve pivotally mounted in said fluid passageway, said ball valve defining a bore having a bore axis extending therethrough; and
   a sleeve positioned in said fluid passageway having a ball valve engagement end and a coiled spring end, said coiled spring end being adapted to receive a coiled spring, said coiled spring urging said ball valve engagement end against said ball valve to maintain said ball valve in a closed position when said pressurized fluid is not actuating said ball valve, whereby pressurized fluid in said fluid passageway at said first end of said annular housing causes said ball valve to pivot from said closed position wherein said fluid passageway axis is substantially perpendicular to said bore axis to an open position wherein said passageway axis is substantially parallel to said bore axis, said open position allowing fluid flow through said fluid passageway from said first end to said second end of said annular housing, and said closed position preventing fluid flow through said fluid passageway from said second end to said first end of said annular housing.

8. The ball check valve assembly of claim 7, wherein said ball valve engagement end includes a plastic bearing positioned between said engagement end and said ball valve.

9. The ball check valve assembly of claim 7, wherein a dashpot is formed between said coiled spring end of said sleeve and said annular housing, said coiled spring being positioned in said dashpot.

* * * * *